US009114963B2

(12) United States Patent
McKernan et al.

(10) Patent No.: US 9,114,963 B2
(45) Date of Patent: Aug. 25, 2015

(54) CLAMPING SURFACE POSITIONING SYSTEM FOR MOBILE LOAD-HANDLING CLAMPS

(71) Applicant: Cascade Corporation, Portland, OR (US)

(72) Inventors: Pat S. McKernan, Portland, OR (US); Gregory A. Nagle, Portland, OR (US)

(73) Assignee: Cascade Corporation, Fairview, OR (US)

( * ) Notice: Subject to any disclaimer, the term of this patent is extended or adjusted under 35 U.S.C. 154(b) by 137 days.

(21) Appl. No.: 13/777,925

(22) Filed: Feb. 26, 2013

(65) Prior Publication Data

US 2014/0240117 A1 Aug. 28, 2014

(51) Int. Cl.
*B60Q 1/00* (2006.01)
*B66F 9/075* (2006.01)
*B66F 9/18* (2006.01)

(52) U.S. Cl.
CPC ............... *B66F 9/0755* (2013.01); *B66F 9/183* (2013.01); *B66F 9/184* (2013.01)

(58) Field of Classification Search
CPC ............ B66F 9/18; B66F 9/183; B66F 9/184; B66F 9/20; B66F 9/22
USPC ............... 340/440, 693.9; 700/213, 214, 229; 187/222, 227
See application file for complete search history.

(56) References Cited

U.S. PATENT DOCUMENTS

| | | | | |
|---|---|---|---|---|
| 2,596,477 A | | 5/1952 | Frischmann et al. | |
| 4,279,564 A | * | 7/1981 | Weinert | 414/621 |
| 4,411,577 A | * | 10/1983 | Shearer, Jr. | 414/274 |
| 4,423,998 A | * | 1/1984 | Inaba et al. | 414/730 |
| 4,435,117 A | * | 3/1984 | House | 414/620 |
| 4,605,354 A | * | 8/1986 | Daly | 414/730 |
| 4,618,306 A | | 10/1986 | Dorsch | |
| 4,682,931 A | * | 7/1987 | House | 414/623 |
| 4,714,399 A | * | 12/1987 | Olson | 414/621 |
| 4,726,729 A | * | 2/1988 | Olson et al. | 414/621 |
| 4,742,468 A | * | 5/1988 | Ohashi et al. | 701/50 |

(Continued)

FOREIGN PATENT DOCUMENTS

| | | | |
|---|---|---|---|
| DE | 3801133 | C2 | 3/1995 |
| DE | 10005220 | C2 | 1/2002 |

(Continued)

OTHER PUBLICATIONS

International Search Report and Written Opinion, dated Dec. 6, 2013, International PCT Patent App. No. PCT/US13/52746, Cascade Corporation, 6 pgs.

*Primary Examiner* — Quang D Pham
(74) *Attorney, Agent, or Firm* — Chernoff Vilhauer McClung & Stenzel, LLP

(57) ABSTRACT

A control system is provided for a load-handling clamp mountable on a vehicle, the clamp having a pair of opposed load-engagement clamping surfaces capable of clamping opposite sides of different types and configurations of loads. At least one of the clamping surfaces is closeable toward the other clamping surface along a direction which extends substantially laterally across a direction of forward approach of the clamp toward the load. The control system is capable of generating a variable signal indicating a desired forward, vertical and/or lateral pre-engagement position of the clamp from which the clamping surfaces can correctly engage the load.

23 Claims, 8 Drawing Sheets

(56) References Cited

U.S. PATENT DOCUMENTS

| | | | | | |
|---|---|---|---|---|---|
| 4,766,322 | A * | 8/1988 | Hashimoto | 250/559.33 |
| 4,832,341 | A | 5/1989 | Muller et al. | |
| 4,861,223 | A | 8/1989 | Olson | |
| 5,009,565 | A | 4/1991 | Esau | |
| 5,052,882 | A * | 10/1991 | Blau et al. | 414/667 |
| 5,292,219 | A * | 3/1994 | Merin et al. | 414/621 |
| 5,330,168 | A | 7/1994 | Enomoto et al. | |
| 5,335,955 | A | 8/1994 | Pekka et al. | |
| 5,516,255 | A * | 5/1996 | Tygard | 414/607 |
| 5,604,715 | A | 2/1997 | Aman et al. | |
| 5,706,408 | A | 1/1998 | Pryor | |
| 5,938,710 | A * | 8/1999 | Lanza et al. | 701/50 |
| 5,984,617 | A * | 11/1999 | Seaberg | 414/623 |
| 6,003,917 | A * | 12/1999 | Tygard | 294/87.1 |
| 6,027,302 | A | 2/2000 | Nilsson | |
| 6,332,098 | B2 | 12/2001 | Ross et al. | |
| 6,439,826 | B1 * | 8/2002 | Jordan et al. | 414/636 |
| 6,611,746 | B1 * | 8/2003 | Nagai | 701/50 |
| 7,121,457 | B2 | 10/2006 | Michal, III | |
| 7,151,979 | B2 | 12/2006 | Andersen et al. | |
| 7,699,141 | B2 * | 4/2010 | Fossier et al. | 187/222 |
| 8,078,315 | B2 * | 12/2011 | McKernan et al. | 700/228 |
| 8,755,929 | B2 * | 6/2014 | McKernan et al. | 700/213 |
| 8,781,617 | B2 * | 7/2014 | McKernan et al. | 700/213 |
| 8,781,618 | B2 * | 7/2014 | McKernan et al. | 700/213 |
| 2001/0039464 | A1 | 11/2001 | Hackauf | |
| 2002/0009356 | A1 * | 1/2002 | Jordan et al. | 414/621 |
| 2003/0233184 | A1 | 12/2003 | Roncari | |
| 2004/0102870 | A1 | 5/2004 | Andersen et al. | |
| 2005/0104397 | A1 * | 5/2005 | Jordan et al. | 294/88 |
| 2006/0058913 | A1 * | 3/2006 | Andersen et al. | 700/214 |
| 2006/0073001 | A1 * | 4/2006 | Chase | 414/621 |
| 2006/0115354 | A1 | 6/2006 | Prentice et al. | |
| 2007/0065271 | A1 * | 3/2007 | Merin et al. | 414/812 |
| 2009/0281655 | A1 * | 11/2009 | McKernan et al. | 700/225 |
| 2009/0326717 | A1 * | 12/2009 | Vaherto | 700/275 |
| 2010/0089704 | A1 * | 4/2010 | Petronek | 187/224 |
| 2013/0058746 | A1 * | 3/2013 | Chase | 414/621 |

FOREIGN PATENT DOCUMENTS

| | | | |
|---|---|---|---|
| DE | 19964034 | C2 | 1/2002 |
| DE | 4433050 | B4 | 1/2004 |
| EP | 0995557 | A2 | 4/2000 |
| EP | 1371601 | A2 | 12/2003 |
| JP | 2003238071 | A | 8/2003 |
| JP | 2010207869 | A | 9/2010 |
| WO | 92/00913 | A1 | 1/1992 |
| WO | 2008/040853 | A1 | 4/2008 |
| WO | 2009/136986 | A1 | 11/2009 |

* cited by examiner

CLAMPING SURFACE POSITIONING SYSTEM FOR MOBILE LOAD-HANDLING CLAMPS

BACKGROUND

This disclosure relates to improvements in positioning systems for controlling mobile load-handling clamps of the type normally mounted on lift trucks or other industrial vehicles for clamping rectilinear loads such as cartons, or cylindrical loads such as paper rolls. In order to ensure damage-free clamping and subsequent handling of such loads, it is critical that the pre-engagement positions of the opposed clamping surfaces of such clamps be substantially correct for the particular load to be clamped. For example, if the pre-engagement positions of the opposed clamping surfaces in the clamp's direction of forward approach toward the load are not at least approximately correct relative to the particular load being clamped, unacceptable pressure concentrations and pressure insufficiencies can occur at different areas of the clamping surfaces when the load is engaged, causing various problems ranging from excessive compression of the load to slippage of the load during subsequent lifting, transporting and depositing of the load. Alternatively, if the pre-engagement positions of the clamping surfaces are not at least approximately vertically correct relative to a carton, the clamping surfaces may fail to engage the carton's internal reinforcement structure resulting in excessive compression of unreinforced portions of the carton. Or, if the pre-engagement positions of paper roll clamping surfaces are not sufficiently centered vertically relative to the paper roll's center of gravity, the paper roll and its transporting vehicle can become unstable when the roll is rotated from a vertical to a horizontal position. In addition, if the pre-engagement spacing between opposed clamping surfaces during their forward approach to the load is too narrow, it can cause gouging or abrading of the load or, if the spacing is too wide, it can cause similar damage to adjacent loads. Furthermore, unsymmetrical side-to-side pre-engagement positioning of the clamping surfaces can cause the load, or the clamp and vehicle, to slide sideways and cause damage during clamping engagement of the load.

Prior load-clamping systems have relied heavily on the operator's judgment and visibility of the clamping surfaces to produce correct pre-engagement positions of vehicle-mounted clamping surfaces relative to different loads of variable sizes and shapes. This is an extremely difficult task for an operator from his visually restricted location on a lift truck operator's seat.

Different types of visual or audible sensor-generated guidance aids have sometimes been provided to help the operator in this task, but such aids are generally reliant only on sensing external surfaces of the load, rather than determining internal features of the load which may be determinative of correct clamping surface positioning. The same has generally been true with respect to automatically-guided vehicle-mounted load clamps. Such approaches based exclusively on external load surfaces are often insufficient to ensure that the clamping surfaces will engage different loads in respective different correct positions to overcome the foregoing problems.

DETAILED DESCRIPTION OF PREFERRED EMBODIMENTS

Figure 1:
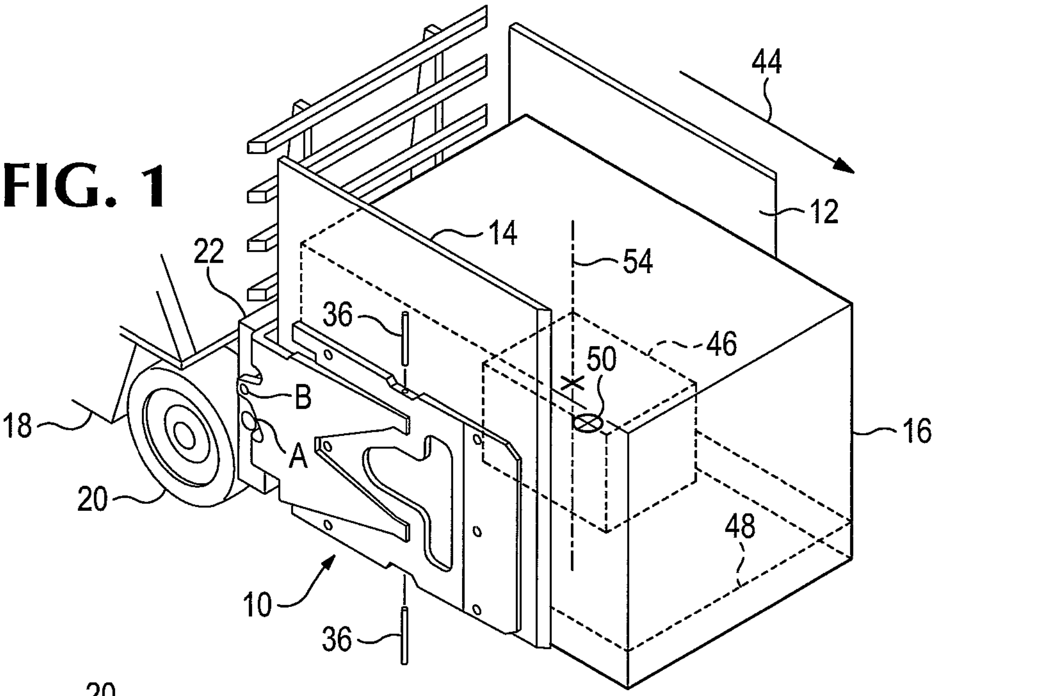
FIG. 1 is a simplified perspective view of an exemplary carton clamp on a lift truck during the process of engaging an exemplary rectilinear load in accordance with a preferred embodiment herein.

The preferred embodiments disclosed herein are specific examples of different solutions to the foregoing problems, and are variable depending upon the type and/or configuration of the load to be clamped. In the preferred embodiments, the clamping surfaces of a carton clamp or a paper roll clamp, as the case may be, are placed in a correct forward position for clamping a particular load by means of an approach of the clamp toward the load by the clamp-carrying vehicle, followed by stopping of the vehicle and clamp at a position which places the clamping surfaces at a correct pre-engagement position along the direction of approach relative to the load. In addition, correct pre-engagement positioning of the clamping surfaces might optionally also involve achieving a correct vertical height of the clamping surfaces relative to the load. Furthermore, correct pre-engagement positioning might also optionally involve correctly spacing the clamping surfaces symmetrically apart on each side of the load, with appropriate side-positioning (i.e. side-shifting) of both clamping surfaces in unison if needed to achieve symmetry, so that the clamping surfaces do not damage the load or adjacent loads during the approach or cause the load or vehicle to slide sideways during subsequent clamping engagement. Once the clamping surfaces are in their correct pre-engagement position, and assuming that the clamp-carrying vehicle remains stopped, the pre-engagement positions ensure that the clamping surfaces will engage the sides of the load in correct positions along linear or curved clamp-closing paths between the pre-engagement and engagement positions of the clamping surfaces, which clamp-closing paths are predetermined by the clamp's mechanical structure.

The problem to be solved herein is how to ensure that the opposed clamping surfaces are at correct pre-engagement positions relative to the particular load before they are closed into load-handling engagement with the load. In view of the operator's difficulty in achieving correct pre-engagement positions of the clamping surfaces as discussed above, and further in view of the dependence of correct clamping surface pre-engagement positions on internal features of the load which the operator can't see, an effective and efficient guidance system for vehicle-mounted load-handling clamps must improve upon previous clamping surface positioning techniques.

A preferred way in which the embodiments of the positioning system described herein improve upon previous vehicle-mounted clamping systems is that the positioning system ascertains, at least approximately, a correct clamping surface pre-engagement position related to one or more determinative minor interior portions or other internal features of the particular type of load and/or load configuration to be clamped. The foregoing internal portions or features are predetermined by the load type and/or load geometric configuration. The load type and/or load geometric configuration are in turn preferably ascertainable from human, and/or sensor or machine vision, observation of load characteristics, or from load identification code-reading.

In the simplest embodiments of the positioning system herein, the correct clamping surface pre-engagement position can preferably be ascertained by the system in response to the operator's observation and subsequent entry of the load-type's identity and/or geometric configuration on a touch screen or other interactive vehicle-mounted terminal from which a microprocessor-based controller can then correlate, from a database such as a lookup table, a correct clamping surface pre-engagement position for the particular load type and/or configuration entered by the operator.

As an alternative example, instead of relying on the operator's observation, an identification code on the load can be scanned by a sensor, from which the controller can determine the same information from the database.

As a further alternative example, a correct clamping surface pre-engagement position can be determined by sensing the exterior surface of the load by rangefinding or other sensing technology, such as machine vision. For example, such sensing can determine the load's approximate center of mass location without requiring that the forward surface of the load first be overtaken along the clamp's direction of approach by a sensor at the forward extremity of the clamp (which may not be possible if the load is relatively long).

Having determined a correct clamp surface pre-engagement position along the forward direction of approach of the clamp toward the particular load to be engaged, the load clamp's approach to the load can preferably be regulated by a system controller which, possibly in response to a conventional range finder such as a SICK brand analog laser sensor, or a machine vision system, or other sensor which senses the changing proximity between the rear surface of the load and the clamp during the clamp's approach toward the load, generates proximity signals to be described hereafter indicating a changing approaching proximity of the clamp with respect to the load. With such a signal, the guidance system can regulate the approach, direction and stopping position of the clamp (and thus of the clamping surfaces) relative to the position or other characteristic of a determinative minor interior portion, or other internal feature, of the load by providing the operator with a humanly-discernible visual or audible changing signal indicative of the changing approaching proximity, which directs him to move forward or rearward and to stop the approach with respect to the load at the correct pre-engagement position of the clamping surfaces.

Alternatively, the guidance system can provide a variable proximity signal enabling the controller, rather than the operator, to automatically regulate the changing approaching proximity and stoppage of the clamp by automatically regulating the vehicle's propulsion, steering and braking systems to decelerate and stop the vehicle at such correct pre-engagement position along the direction of approach.

In addition to guiding the correct pre-engagement position of the clamping surfaces along the direction of approach as described above, the guidance system of the preferred embodiments may optionally, in a similar manner, guide either the operator or a controller to obtain the correct pre-engagement position of the clamping surfaces in a vertical direction relative to a predetermined minor interior portion or other internal feature of the load.

Furthermore, the guidance system may optionally guide the operator or controller, preferably before or during the approach to the load, to obtain correct laterally spaced pre-engagement positions of the clamping surfaces in a direction which substantially laterally crosses the clamp's direction of approach, possibly using a laterally-directed range finder or other proximity sensor, or machine vision, to obtain symmetrical side-positioning of the clamping surfaces relative to the load. Such lateral guidance will avoid damage to the load and adjacent loads during the approach of the clamp toward the load, and avoid inadvertent sideways sliding of the load or vehicle during subsequent clamping engagement.

Figure 2:
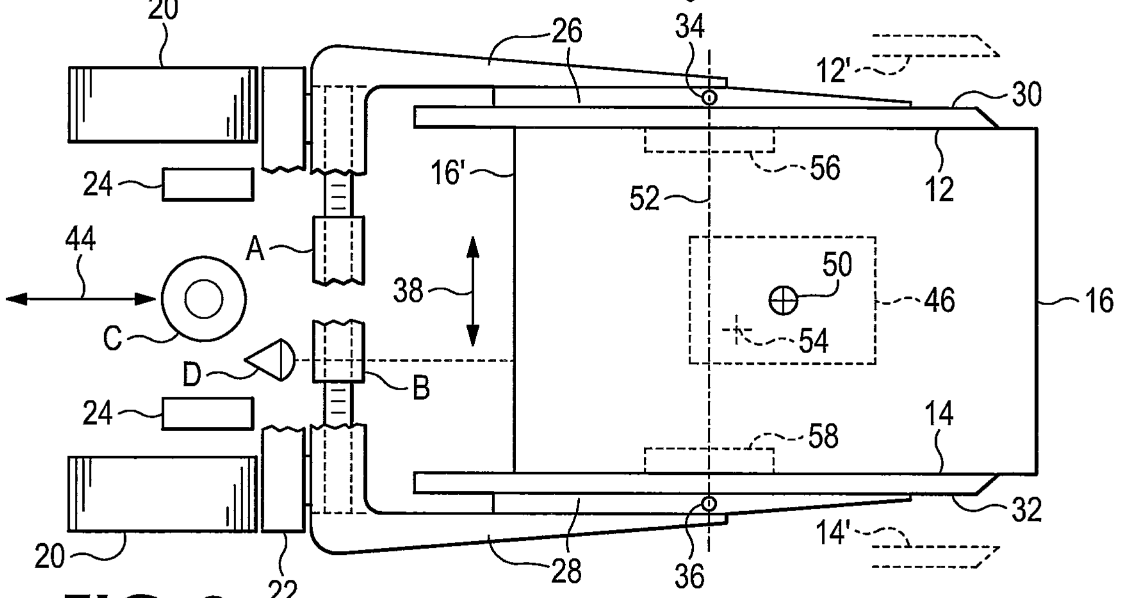
FIG. 2 is a top view of the clamp of FIG. 1.

FIGS. 1 and 2 show an exemplary embodiment of a carton clamp, generally indicated as 10, having clamping surfaces 12 and 14 for engaging the sides of a rectilinear load 16 such as a carton. Although the load 16 is pictured as a single carton, it could comprise multiple smaller rectilinear cartons stacked side by side and/or atop one another. The clamp 10 is shown mounted on a lift truck 18 having spaced front wheels 20. The lift truck has a hydraulic lift cylinder C which selectively raises and lowers a load carriage 22, and thereby the clamp which is mounted on the load carriage 22, on a lift truck mast 24. Respective clamp arms 26 and 28 support respective clamp pads 30 and 32 which contain respective clamping surfaces 12 and 14. Respective pivot pins 34 and 36 pivotally mount the clamp pads and their respective clamping surfaces to the clamp arms so that the clamping surfaces are pivotable about respective vertical axes with respect to the clamp arms 26 and 28. The pivot pins 34 and 36 maximize the uniformity of the pressure applied to the sides of the load 16 over the respective areas of the clamping surfaces 12 and 14.

The clamp arms 26 and 28, with their pivotable clamping surfaces 12 and 14, are slidable laterally on the load carriage 22 selectively toward and away from one another along a clamp closing/opening direction 38 in response to the actuation of a pair of oppositely facing hydraulic cylinders A and B. With the clamp aims 26 and 28 spaced laterally widely enough apart prior to engaging the load 16 to avoid striking the load 16, but narrowly enough apart to avoid striking adjacent loads or other obstacles, the lift truck 18 under the regulation of the guidance system, either through the operator or automatically, causes the clamp 10 to approach the load along a forward direction of approach 44 to place the clamping surfaces 12 and 14 within a correct pre-engagement position range along the forward direction 44 as indicated by numerals 12' and 14' in FIG. 2, where the lift truck stops its approach. The lift cylinder C preferably also places the height of the clamping surfaces 12 and 14 within a correct pre-engagement position range in a vertical direction relative to the load 16. Thereafter the clamping cylinders A and B close the clamping surfaces 12 and 14 toward each other into engagement with the sides of the load 16.

In the example of FIGS. 1 and 2, for purposes of illustration the clamping surfaces 12 and 14 are shown to be within their correct engagement position range with respect to two different predetermined minor interior portions 46 and 48, respectively, of the load 16. Minor interior portion 46 is a central interior portion of the load 16 which includes the center of gravity 50 of the load, and is determinative of correct clamping surface positioning along the direction of approach to the load. The reason that there is a second determinative minor interior portion 48 of the load in the example of FIGS. 1 and 2 stems from the fact that the load 16 is a carton having a reinforced base occupying a differently located minor interior portion 48 at the bottom of the carton which is determinative of correct clamping surface positioning vertically. That is, the first minor interior portion 46 is determinative of the correct engagement and pre-engagement positions of the clamping surfaces 12 and 14 along the direction of approach 44, but is not determinative of the correct engagement and pre-engagement positions of the clamping surfaces 12 and 14 in a vertical direction in this particular example because the reinforced base portion 48 of the load 16 must be engaged by the bottoms of the clamping surfaces as shown in FIG. 1. Otherwise, if the clamping surfaces were to engage the load above the reinforced base 48, they could excessively compress the load and possibly also fail to adequately support the load when the clamp lifts the load, even though they are correctly positioned along the clamp's direction of approach. This illustrates how correct clamping surface positioning is dependent upon the type of load being clamped. Similar dependencies on load type apply to such variables as the predetermined locations, sizes, shapes, and tolerances selected for the minor interior portions of the load considered to be determinative. Such variables are also dependent on the user's previous experience with the various particular types of loads involved.

In the example of FIGS. 1 and 2, the pre-engagement and engagement positions of the clamping surfaces 12 and 14 along the direction of approach 44, relative to the central minor interior portion 46 of the load, need not be exactly centered on the center of gravity 50 but can be considered satisfactory if an imaginary line 52 (FIG. 2), interconnecting the respective upright pivot axes of the pivot pins 34 and 36, extends adjacent to a second imaginary line 54 extending vertically through the central minor interior portion 46. Since the central minor interior portion 46 includes the center of gravity 50 of the load, this would ensure that the weight of the load 16 would at least approximately be centered on the clamping surfaces 12 and 14 along the direction of approach 44, and also approximately centered with respect to the pivot axes so that the clamping surface pressure would be distributed relatively uniformly on the forward and rearward sides of the center of gravity 50 along the direction of approach 44. Alternatively, satisfactory engagement positions can occur if predetermined central minor areas 56 and 58, respectively, of the clamping surfaces 12 and 14, are interconnected by an imaginary line, such as 52, extending adjacent to an imaginary line such as 54 extending vertically through the minor interior portion 54.

Figure 2A:
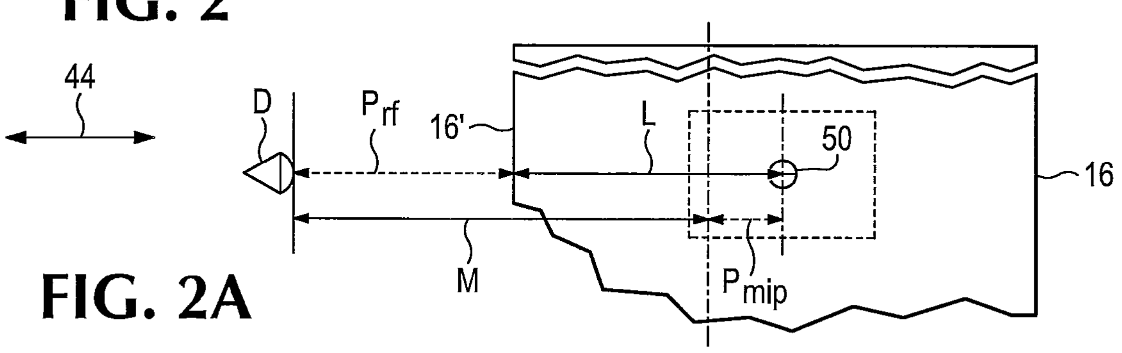
FIG. 2A schematically depicts an example of how a rangefinder can be used in the load engagement process in FIGS. 1 and 2.

During the approach of the clamp, the guidance system controller regulates the approach and stopping of the clamp 10 along the direction of approach 44 by using a rangefinder D, or other appropriate proximity sensing system as mentioned previously, on the carriage 22 to sense a changing proximity of the rear surface 16' of the load relative to the rangefinder D. The controller converts the rangefinder's changing proximity signal to one which indicates the resultant changing proximity of the minor interior portion 46 of the load relative to the pivot pins 34 and 36, or relative to the predetermined central areas 56 and 58 of the respective clamping surfaces 12 and 14. With reference to FIG. 2A, one example of different possible ways in which the controller could convert the rangefinder's changing proximity signal Prf to a changing proximity signal Pmip, indicative of the changing proximity of the pivot pins or central areas of the clamping surfaces with respect preferably to the center 50 of the minor internal portion 46 of the load (whether or not such center is also a center of gravity), is the following conversion formula:

$$Pmip=Prf+L-M$$

In the formula, L is the length between the center 50 and the rear surface 16' of the load along the direction of approach, and M is the mechanical distance along the direction of approach between the rangefinder D and the clamping surface pins 34 and 36 or centers of the respective central areas 56 and 58 of the clamping surfaces 12 and 14.

Figure 3:
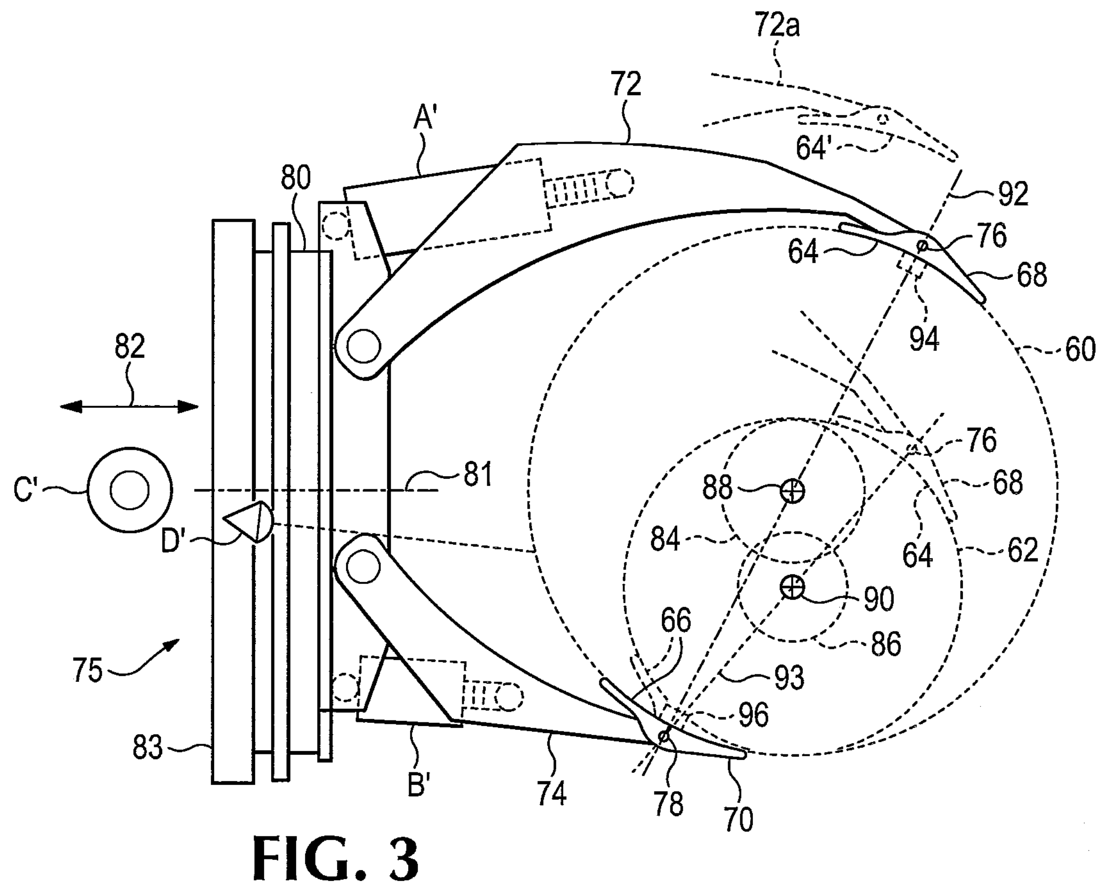
FIG. 3 is a simplified side view of an exemplary paper roll clamp during the process of engaging two alternative different sizes of paper rolls in accordance with a preferred embodiment herein.
Figure 4:
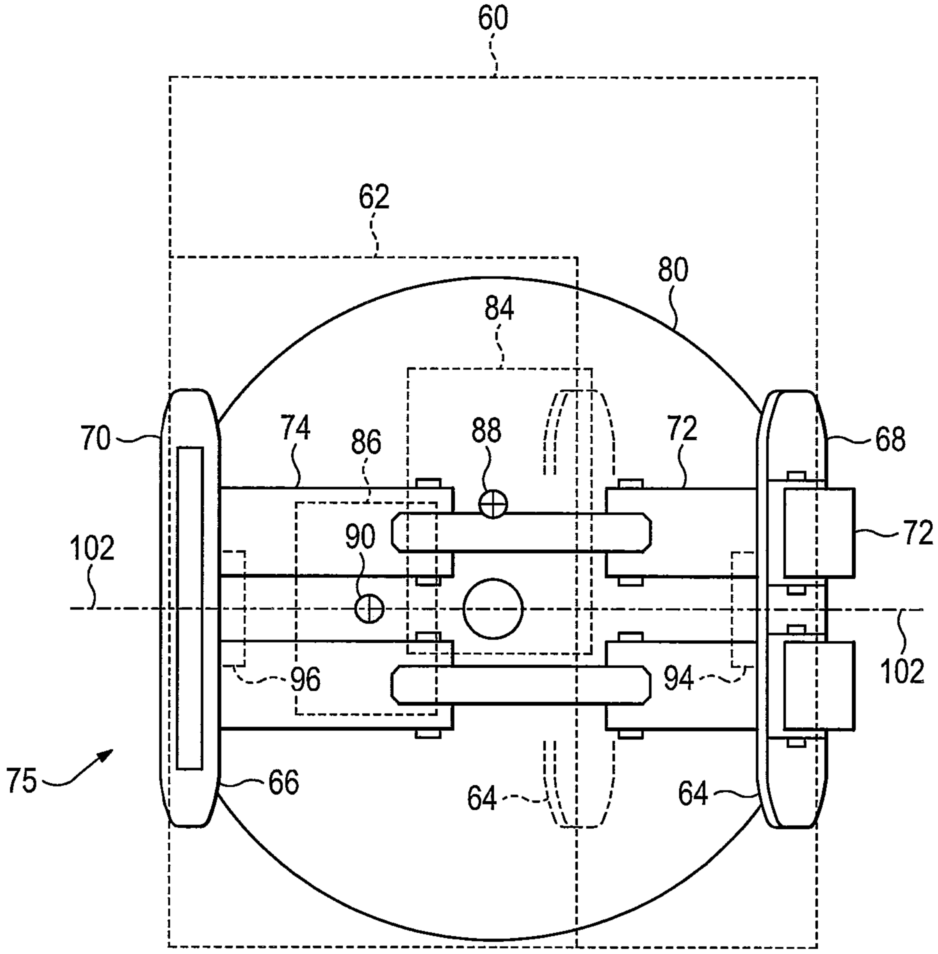
FIG. 4 is a front view of the clamp of FIG. 3.

FIG. 3 (top view) and FIG. 4 show a different example wherein alternative vertically oriented cylindrical paper rolls 60 or 62 of different diameters can each be engaged by curved clamping surfaces 64 and 66 of respective clamp pads 68 and 70 supported by pivoting, rather than sliding, clamp arms 72 and 74 of a typical paper roll clamp 75. The clamp pads 68 and 70 are pivotally connected to the clamp arms 72 and 74 by pivot pins 76 and 78 respectively. The longer clamp arm 72 pivots in response to extension and retraction of a hydraulic cylinder A', and the shorter clamp arm 74 pivots in response to a hydraulic cylinder B'. Alternatively, the shorter clamp arm 74 might simply be fixed, rather than pivotable.

Because paper rolls are normally intended to be engaged and handled not only in vertical axis orientations as shown in the examples of FIGS. 3 and 4, but also in horizontal axis orientations (not shown), a clamp rotator 80 is normally provided which is rotatable about an axis 81 extending along the direction of approach 82 of the clamp. The rotator is mounted on a lift truck carriage 83 liftable vertically by a lift cylinder C' of the lift truck. A hydraulically actuated side shifter (not shown) may optionally be installed between the lift truck carriage 83 and the rotator 80 to slide both clamp arms 72 and 74 in unison crosswise to the direction of approach 82. A range finder D', similar to the range finder D shown in FIG. 2 and operating in a similar manner, is provided on the lift truck carriage to likewise sense the variable proximity of the clamp relative to the rear surfaces of the alternative paper rolls 60 and 62. The range finder D' operates along an axis tilted slightly toward the short clamp arm 74 so as to more accurately measure proximity of the clamp relative to the variously curved rear surfaces of alternative differently sized paper rolls.

The clamp of FIGS. 3 and 4, like the clamp of FIGS. 1 and 2, has a controller responsive to the range finder D' which generates a variable signal indicating a changing approaching proximity of the clamp, along the direction of approach 82, relative to a predetermined minor interior portion of each respective paper roll to be clamped, in the same manner as the controller previously described relative to FIGS. 1 and 2. The predetermined central minor interior portion 84 of the larger cylindrical paper roll 60, and minor interior portion 86 of the alternative smaller cylindrical paper roll 62, are considered to be determinative of proper clamping surface positioning for paper roll-type loads. Each minor interior portion 84 and 86 of the respective paper rolls 60 and 62 includes a respective center of gravity 88 and 90 of the respective paper roll. The respective positions of the minor interior portions 84 and 86 of the paper rolls can be determined and used generally in the same ways as previously explained with respect to FIGS. 1 and 2. As before, the guidance system regulates both the approach and the stopping position of the clamp with respect to the minor interior portion 84 or 86, either by providing the operator with a humanly-discernible visual or audible signal indicative of the changing approaching proximity or, alternatively, by providing a variable proximity signal to an electrical controller enabling the controller to regulate the changing approaching proximity of the clamp by automatically regulating the vehicle's propulsion, steering and braking systems to automatically decelerate and stop the vehicle at the correct pre-engagement position of the clamping surfaces along the direction of approach.

As is evident in FIG. 3, the pre-engagement position of clamping surfaces 64 and 66 enables either paper roll 60 or 62 to be engaged with the axes of the respective clamp pad pivot pins 76 and 78 in positions interconnected by a first imaginary line 92 or 93, respectively, which extends adjacent to a second imaginary line extending vertically through the predetermined minor interior portion 84 or 86 as the case may be. For example, such vertical second imaginary lines could be respective lines extending vertically through a respective center of gravity 88 or 90 as shown in FIG. 3. At the clamping surface engagement positions, it should also be noted in FIG. 3 that the pivot axes 76 and 78 of the two clamping surfaces 64 and 66 respectively, as well as respective central minor areas 94 and 96 of their clamping surfaces, are likewise interconnected by the same imaginary lines 92 or 93 depending on which paper roll 60 or 62 is engaged.

Figure 3A:
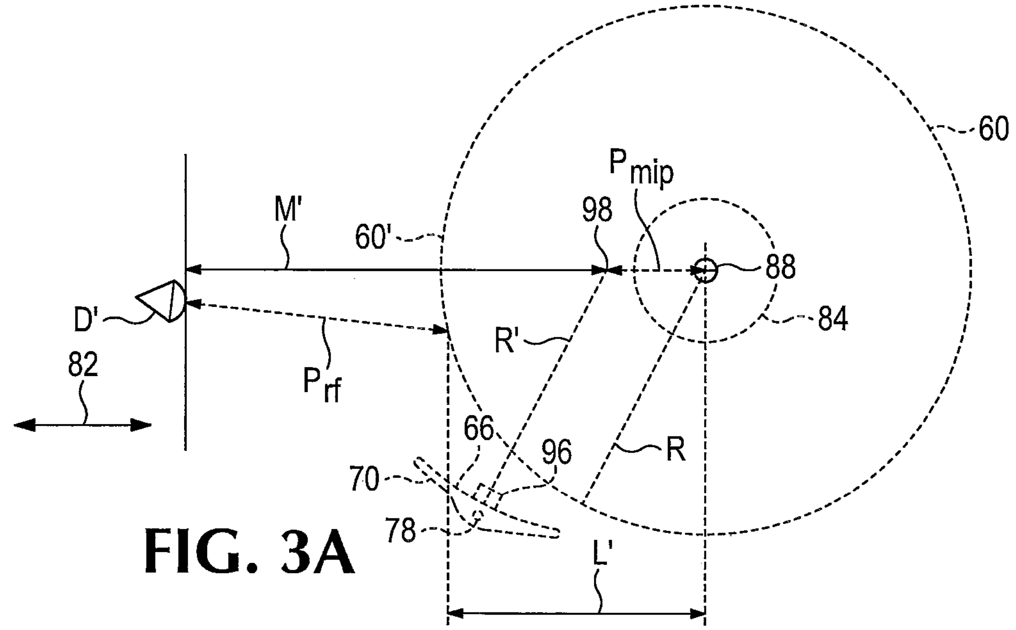
FIG. 3A schematically depicts an example of how a rangefinder can be used in the load engagement process in FIG. 3.

During the approach of the clamp 75 toward the paper roll as schematically shown in FIG. 3A, the guidance system controller regulates the approach and stopping of the clamp 75 along the direction of approach 82 by using the rangefinder D' to sense a decreasing proximity of the rear surface 60' of the paper roll relative to the rangefinder D'. One example of different possible ways, in which the controller could convert the rangefinder's changing proximity signal to one which indicates the resultant decreasing proximity of the determinative minor interior portion 84 of the paper roll 60 relative to the clamping surfaces 64 and 66, could be similar to that previously described with respect to FIG. 2A. The conversion formula used for the paper roll clamp 75 could be the same as with respect to FIG. 2A except that, because the two clamp arms 72 and 74 are of significantly different lengths, an element M' would be substituted in the formula for the element M previously used in FIG. 2A. The substituted element M' could be the mechanical distance, along the direction of approach 82, between the rangefinder D' and a point 98 at the end of an imaginary line R', which extends from the central area 96 of the clamping surface 66 parallel to, and with the same length as, a known radius R of the paper roll 60 to be engaged. The slope of the parallel radius R of the paper roll 60 could be chosen to be the same as the slope of the diameter 92 (FIG. 3) of the paper roll 60 between the intended correct engagement positions of the clamping surfaces 64 and 66.

The guidance system may optionally, in a similar manner to the embodiment of FIGS. 1 and 2, guide either the operator or controller to cause the lift cylinder C' to obtain the correct pre-engagement position of the clamping surfaces in a vertical direction relative to the predetermined minor interior portion of either one of the paper rolls 60 and 62. In this regard, it can be seen in FIG. 4 that vertically central minor areas 94 and 96 of the clamping surfaces 64 and 66, respectively, are interconnected by an imaginary line 102 extending laterally through the vertically central minor interior portions 84 and 86 of each paper roll 60 and 62 respectively, indicating that both clamping surfaces 64 and 66 have been correctly positioned vertically, relative to the respective minor interior portions 84 or 86 of either one of the paper rolls 60 and 62, in both their pre-engagement and engagement positions.

With respect to guiding the operator or controller to obtain a correct lateral spacing and/or side-positioning of the clamping surfaces relative to the cylindrical loads during the approach of the clamp toward the load, the situation of FIGS. 3 and 4 is different than in FIGS. 1 and 2 because the opposed clamp arms 72 and 74 of different lengths make it possible to engage (or deposit) a paper roll selectively in either a vertical or a horizontal position. It is often the practice to keep the shorter arm 74 of the paper roll clamp in the same position for different roll diameters as exemplified by FIGS. 3 and 4. In fact, as mentioned above, in some clamps the shorter arm may be fixed, rather than pivotable. Thus the clamping surface 64 of the longer clamp arm 72 would have a pre-engagement position, such as 64' in FIG. 3, which results in an engagement position 64, both of such positions being forward of the position of the clamping surface 66 of the shorter clamp arm 74. During the approach of the clamp 75 toward the paper roll, the approach of the clamping surface 66 of the short clamp arm 74 is usually stopped at a pre-engagement position very closely adjacent to, or even touching, the paper roll as shown in FIG. 3, while the opposed clamping surface 64 of the longer clamp arm 72 is simultaneously stopped at a pre-engagement position such as 64' spaced from the surface of the paper roll. Thereafter the clamping surface 64 is moved from its pre-engagement position 64' into engagement with the paper roll, forcing the roll against the other clamping surface 66 which has not been moved by its clamp arm 74.

Figure 5:
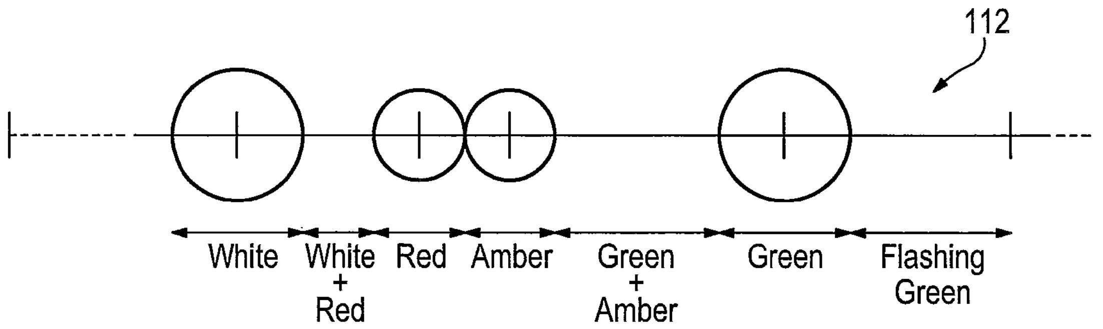
FIGS. 5, 6 and 7 are exemplary different types of possible changing proximity displays for guiding the operator in controlling the load engagement process in FIGS. 1-4.

FIG. 5 is a schematic diagram showing an example of a relatively simple humanly-discernible light display 112 for visually guiding an operator in regulating the changing proximity and respective correct stopping positions of the clamping surfaces along the clamp-carrying vehicle's direction of approach 44 or 82, in response to a rangefinder such as D or D'. The lights actuate progressively during the approach, in response to decreasing proximity to the correct stopping position for the particular load, enabling the operator to decelerate the approach to the load either forwardly or by backing up to arrive at an accurate stopping position. Alternatively, progressive audible signals could be used for the same purpose.

Figure 6:
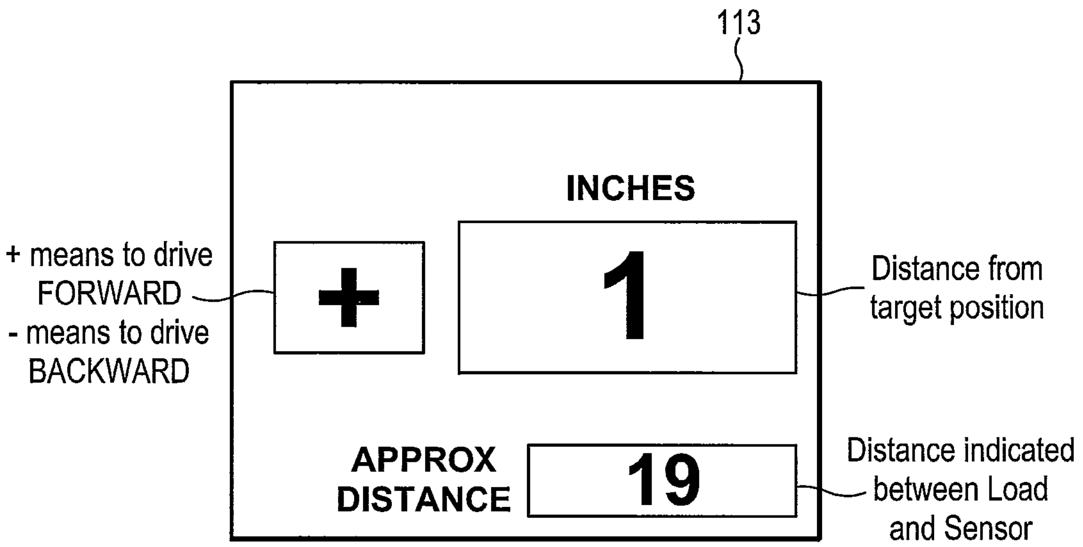

FIG. 6 shows an alternative numerical visual display 113 whereby the operator is informed not only of the gradually decreasing proximity to the correct stopping position, but also of the rangefinder's changing proximity to the rear surface of the load, as well as a plus or minus signal indicating whether the stopping position is forward or rearward of the vehicles' current position.

Figure 7:
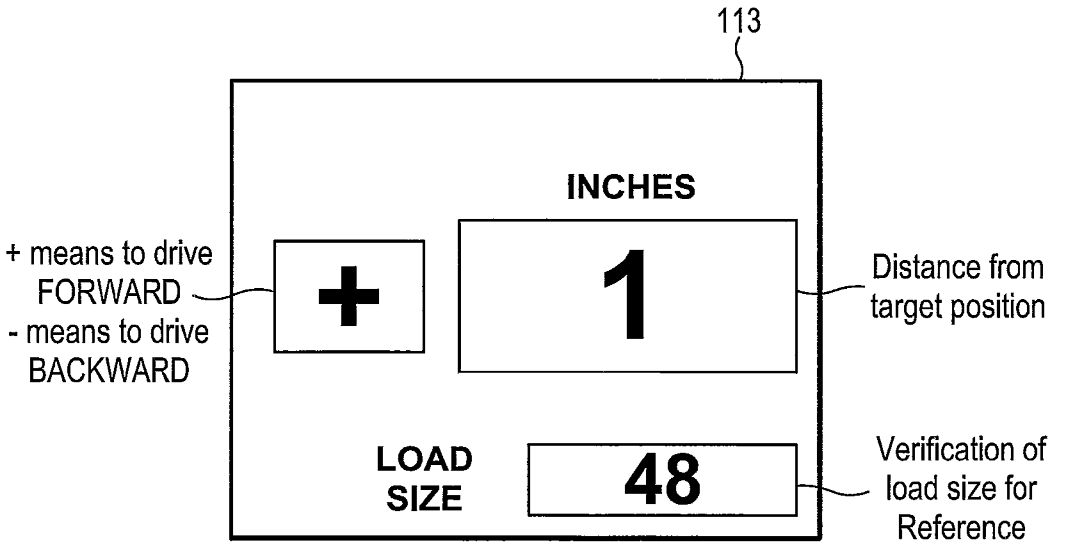

FIG. 7 shows a display 113' similar to FIG. 6, except that instead of displaying the rangefinder's changing proximity to the rear surface of the load, the external dimension of the load to be engaged is displayed to enable the operator to verify that the proximity regulation system is properly set for the actual load.

Figure 8:
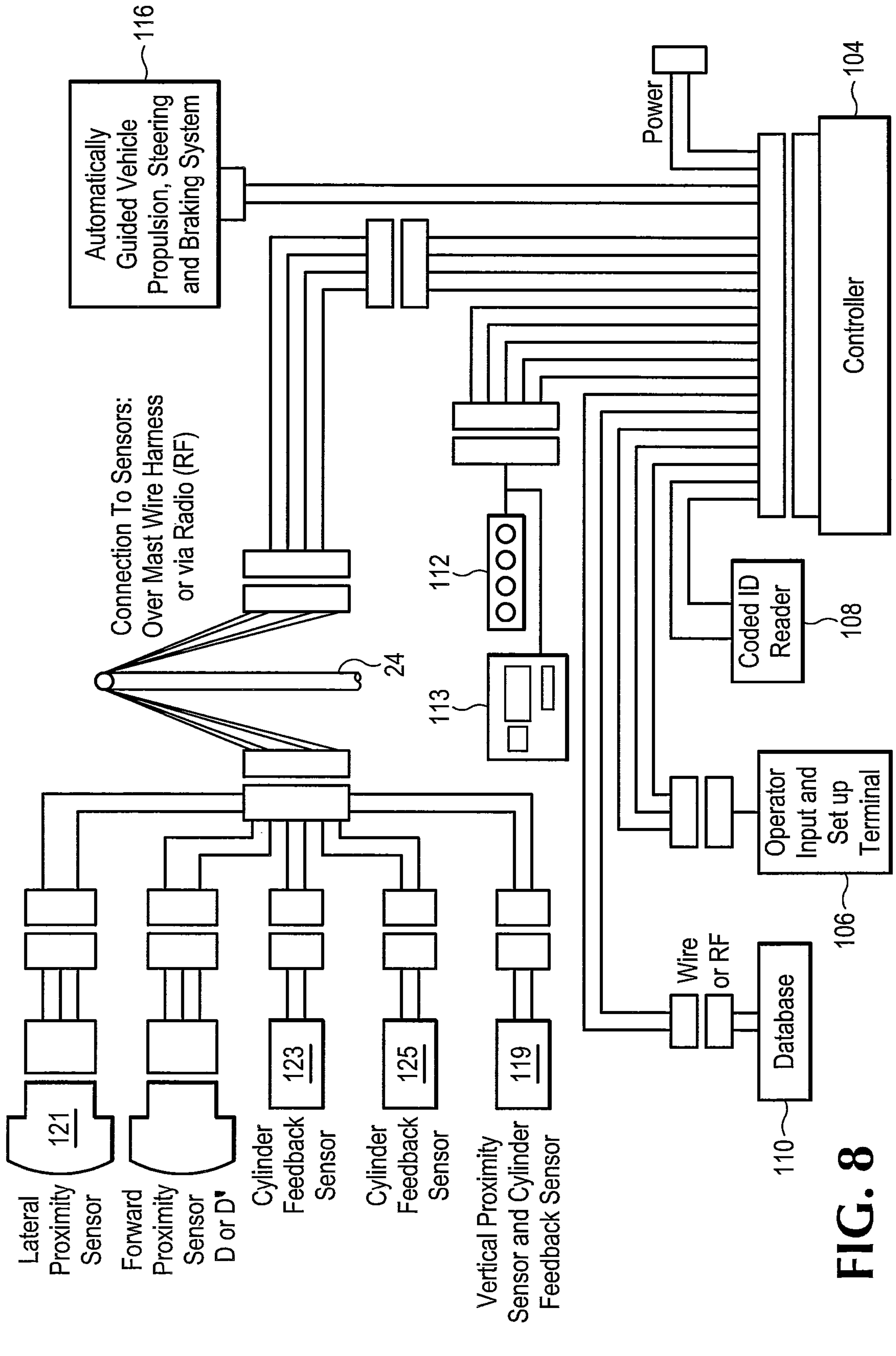
FIG. 8 is a schematic diagram of an exemplary controller-operated system having alternative elements either for guiding the operator, or for automatically controlling the vehicle and clamps of FIGS. 1-4, during the load engagement process.

FIG. 8 is a schematic composite diagram of a number of different possible alternative embodiments of the guidance system which can be selected. A programmable, preferably time-referenced, microprocessor-based controller 104 is provided to receive instructions, operating parameters, and/or input data regarding loads to be handled from an operator input terminal 106, or a bar code or RFID load identification reader 108, or a warehouse management system database 110. The controller 104 can also receive proximity information from a forward range finder D or D' or other forward proximity sensor such as a machine vision system, and convert it to modified proximity information for guiding the operator in regulating the clamp's forward approach toward the load, as previously described. The controller 104 can thereby generate one or more variable signals indicating a changing approaching proximity of the clamping surfaces with respect to a determinative minor interior portion of the load and a stopping signal as discussed above, indicating to the operator the approaching proximity and correct stopping position for the clamp in humanly-discernible form on the operator's display 106, or progressive display of lights 112, or numerical distance display 113, or conventional progressive audible signal (not shown). Similarly, a lift cylinder vertical proximity sensor 119, and/or a clamping surface lateral proximity sensor 121, can be employed to guide the operator to insure respective correct vertical, and/or laterally symmetrical, pre-engagement positioning of the clamping surfaces relative to the load.

Alternatively, if the guidance system is intended to automatically control forward, vertical, and/or lateral clamping surface positioning relative to the load, rather than by guiding the operator to do so, the guidance system could preferably send its variable proximity and stopping signals to a conventional automatic propulsion, steering and braking system 116 of a clamp-carrying automatically-guided vehicle to enable the controller 104 to regulate the clamp's forward approach to the correct pre-engagement position automatically in response to the above-described sensor D or D', and/or the clamp's vertical approach to the correct pre-engagement position in response to the above-described sensor 119, and/or the clamp's lateral approach to the correct pre-engagement position in response to the above-described sensor 121. In such case, the hydraulic clamping cylinders A or A' and B or B', together with lift cylinders C or C', could also be automatically regulated by the controller 104, preferably in response to sensors 119, 123, 125 acting as position feedback sensors.

Figure 9:
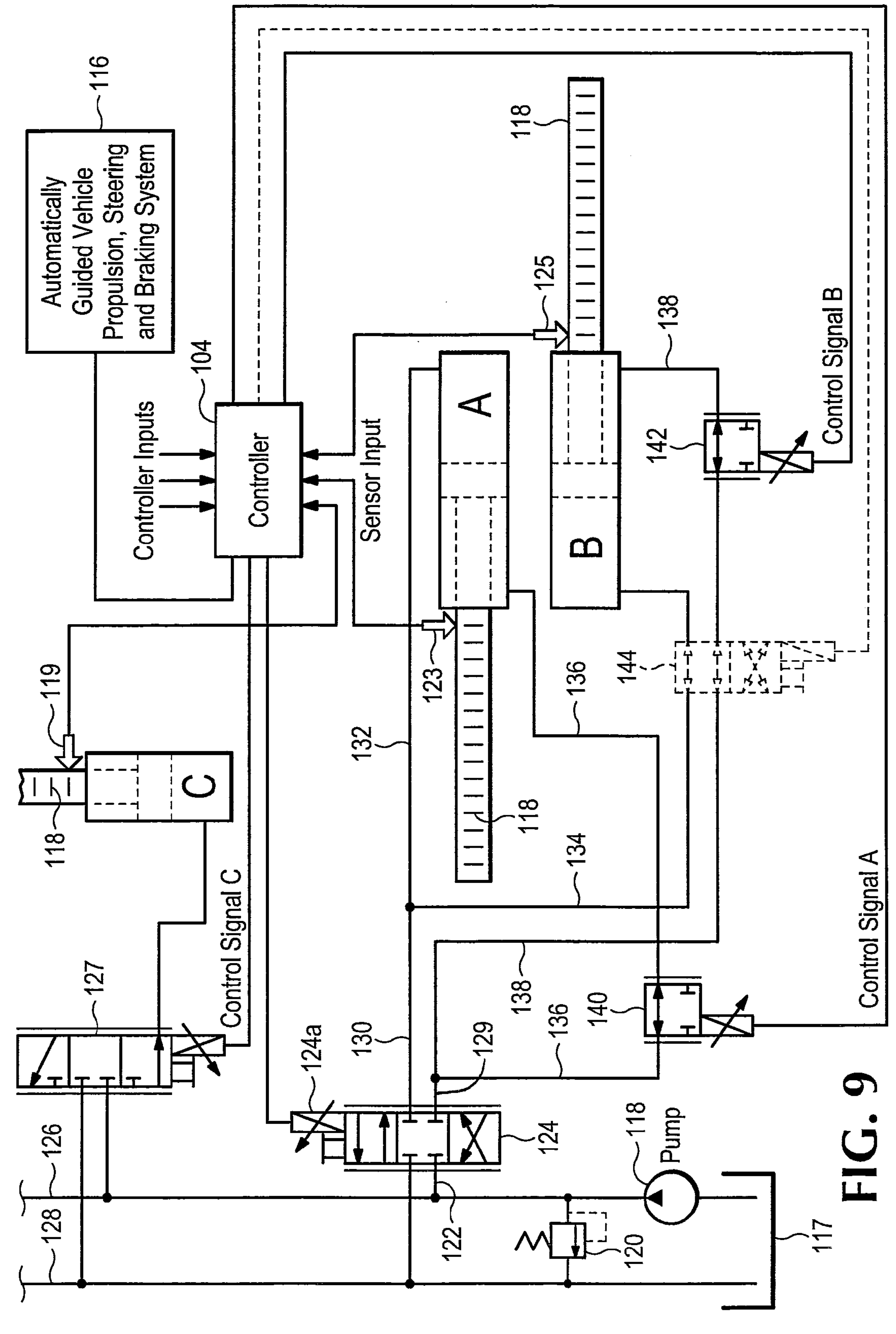
FIG. 9 is an exemplary electro-hydraulic circuit usable with the system of FIG. 8.

A preferable type of piston and cylinder assembly having an internal position feedback sensor suitable for actuators A, B and C of FIGS. 1 and 2 is a Parker-Hannifin piston and cylinder assembly as shown in U.S. Pat. No. 6,834,574, the disclosure of which is hereby incorporated by reference in its entirety. With reference to FIG. 9 herein, each such piston and cylinder assembly includes an optical sensors 123, 125 or 119, respectively, capable of reading finely graduated unique incremental position indicia 118 distributed along each respective piston rod of the cylinders A, B and C. As explained in the foregoing U.S. Pat. No. 6,834,574, the indicia 118 enable a respective sensor 123, 125, or 119 to discern the location of the piston rod relative to the cylinder, as well as the changing displacement of the piston rod as it is extended or retracted. Alternative types of sensor assemblies also useable for this purpose could include, for example, magnetic code type sensors, or potentiometer type sensors, or laser sensors.

The sensors 123, 125 and 119 transmit signal inputs to the controller 104, enabling the controller to sense the respective movements of the cylinders A, B and C, including not only the respective linear positions of their piston rods, but also the displacements and directions of travel of each piston rod. If rotary actuators were used to perform the functions of any of the cylinders A, B or C, the same basic position-sensing principles could be used with rotary components.

The sensors 123, 125 and 119 of the respective hydraulic cylinders in FIG. 9 provide cylinder position feedback, and thus clamping surface position feedback, of the load clamp, enabling the controller 104 to automatically correct any mispositioning of a cylinder A, B or C and thereby controlling both the lateral and vertical positions of the clamping surfaces with high accuracy. Simultaneously, the range finder D or D' similarly provides position feedback for the automatically guided vehicle propulsion and braking system which positions the clamping surfaces along the forward direction of approach with respect to the load as previously described, thereby providing highly accurate positioning of the clamping surfaces along the direction of approach. Thus, no operator intervention is required to ensure accurate results in the automatically controlled embodiment.

The exemplary electro-hydraulic circuitry of FIG. 9 preferably receives pressurized fluid from a reservoir 117 and pump 118 on the lift truck 18, under pressure which is limited by a relief valve 120, and conducts the fluid through a conduit 122 and a three-position flow and direction control valve 124 to the opposed clamping cylinders A and B. The valve 124 is preferably a proportional flow control type which can be variably regulated by a proportional electrical solenoid **124*a* responsive to the controller 104. The pump 18 also feeds a proportional three-position flow and direction control solenoid valve 127 which controls the vertical actuation of the hydraulic lift cylinder C. The pump 18 also feeds other lift truck hydraulic components and their individual control valves (not shown) through a conduit 126. A conduit 128 returns fluid exhausted from all of the hydraulic components to the reservoir 117**.

To extend both piston rods from the cylinders A and B simultaneously in opposite directions to open the clamping surfaces of FIGS. 1 and 2 away from each other, the spool of the valve 124 is shifted upwardly in FIG. 9 to provide fluid under pressure from pump 118 to conduit 130 and thus to parallel conduits 132 and 134 to feed the piston ends of the respective cylinders A and B. As the piston rods extend, fluid is simultaneously exhausted from the rod ends of the cylinders A and B through conduits 136 and 138 through normally open valves 140 and 142, respectively, and thereafter through valve 124 and conduit 128 to the reservoir 117.

Conversely, shifting the spool of the valve 124 downwardly, to close the clamping surfaces toward each other in FIGS. 1 and 2, retracts the two piston rods simultaneously by directing pressurized fluid from the pump 118 through conduit 129 and respective conduits 136 and 138 and valves 140 and 142 to the respective rod ends of the two cylinders A and B, while fluid is simultaneously exhausted from their piston ends through respective conduits 132 and 134 and through the valve 124 and conduit 128 to the reservoir 117.

Any necessary position correction of the cylinders A, B and C is accomplished by valves 140, 142 and 127, respectively, which are electrically operated separately to regulate the respective flows of hydraulic fluid through the respective cylinders A, B and C to repeatedly correct any variance from their respective intended positions in response to position correction signals from the controller 104. The same valves also preferably regulate the respective flows of hydraulic fluid through the respective hydraulic cylinders A, B and C to control their respective velocities, accelerations and decelerations separately. To accomplish this, valves 140, 142 and 127 are preferably variable-restriction flow control valves.

Such valves can also decrease and eliminate any unintended differences between the respective simultaneous movements of the cylinders to achieve accurate coordination of such movements. For example, under the automatic command of the controller 104, valves 140 and 142 can variably restrictively decrease the respective flow of fluid through whichever one of the two hydraulic cylinders A and B might be leading the other in movement in an unintended way. This coordination feature is also useful if an optional valve such as 144 is provided to reverse the direction of movement of cylinder B without likewise reversing the direction of cylinder A, so that the respective opposed clamping surfaces can selectively be moved simultaneously in the same direction to symmetrical side-positioned pre-engagement locations.

An exemplary electro-hydraulic circuit for the paper roll clamp cylinders A', B' and C' of FIGS. 3 and 4 would be similar to that just described, except that the cylinders A' and B' would move in the same extension and retraction directions for clamp closing and opening, respectively, and would move in respective opposite extension and retraction directions for symmetrical side-positioning purposes.

As mentioned earlier, the operator display and input terminal 106 may preferably be of an interactive touchscreen, voice, and/or eye movement/gaze tracking type for operator selection and system input purposes. It is connected to the microprocessor-based controller 104 having a memory preferably containing the aforementioned lookup table with respect to different types and/or geometric configurations of the different loads likely to be engaged by the clamp, such information being related to any determinative internal features of the different loads and being correlated with the desired correct pre-engagement clamping surface positions. The lookup table may also contain information with respect to different optimal maximum and/or minimum clamping force or pressure settings with which the clamp should engage the different loads depending at least partially on the same load type and/or geometric configuration information, so that clamping force can also be regulated automatically by the controller through a conventional solenoid operated variable hydraulic pressure control valve, such as a proportional pressure relief or pressure reducing valve (not shown) connected to the clamp-closing hydraulic conduit 129 of FIG. 9. All of such information is correlated, preferably through such lookup tables, with the various different loads likely to be engaged by the clamp. Such lookup tables may either be customized for a particular load handling operation or selectable by each different load handling operation for its particular needs.

FIGS. 10-13 depict an exemplary interactive operator display and input terminal which translates the load type and/or geometric configuration variables into displays easily recognizable and understandable visually by a clamp operator, and preferably but not necessarily comparable visually by the operator with a particular load which he is about to engage, so that he can input information representative of these variables into the controller 104 to enable the terminal 106 to guide the operator, or the controller 104, to place the clamping surfaces in their proper pre-engagement positions for each different load, and optionally also control clamping force if desired.

Figure 10:
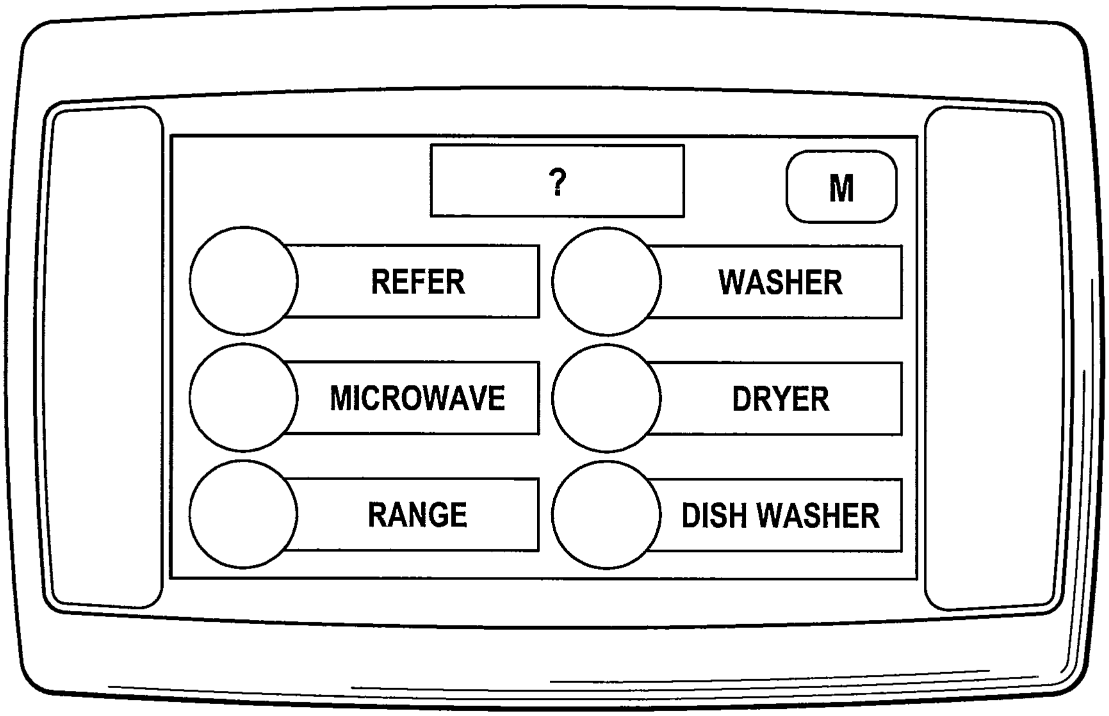
FIGS. 10-13 show an exemplary interactive operator terminal with an exemplary sequence of displays which could optionally be employed in conjunction with the system of FIGS. 8 and 9 to enable an operator to select and input the load type and/or geometric configuration of a particular load which the operator is observing visually preparatory to engagement.
Figure 11:
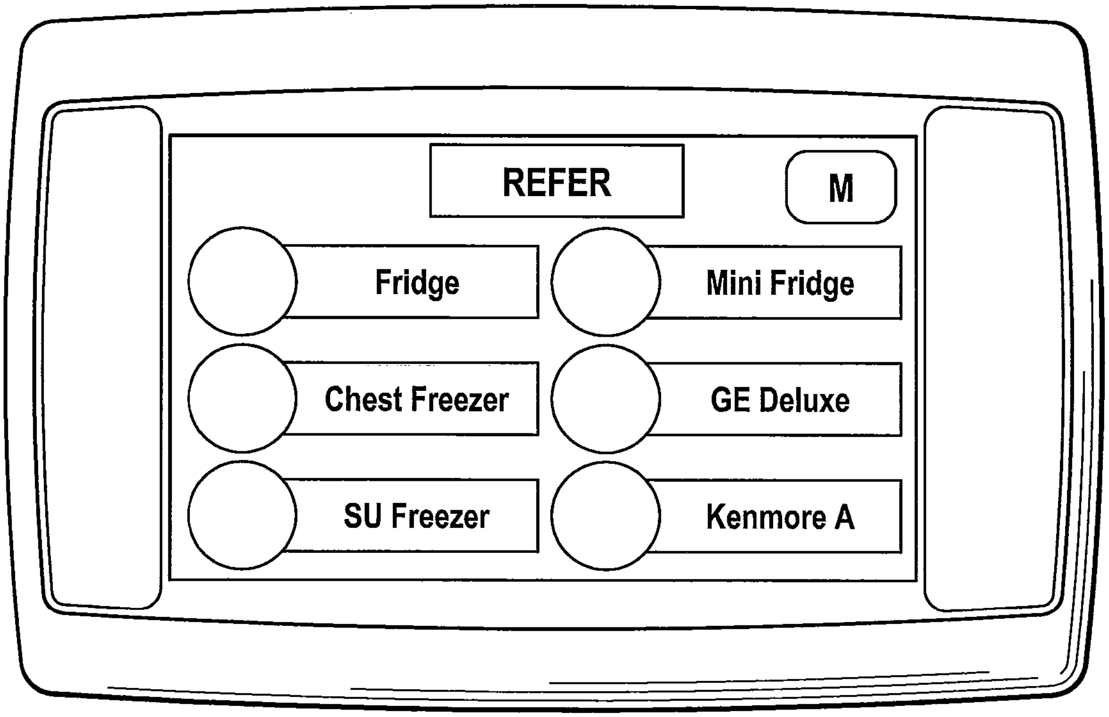

The exemplary display of FIG. 10 is for a clamp operator working in a load handling facility containing kitchen and laundry room electrical household appliances. (If other different broad types of loads were also expected to be handled in the same facility, the screen of FIG. 10 might be preceded by a similar screen listing those other broad types, from which the operator could select the type corresponding to FIG. 10.) The exemplary screen of FIG. 10 lists six different broad types of such household appliances so that the operator can compare such types visually to the particular load which he is about to engage. If the operator is looking at a refrigeration appliance load, for example, he would then touch the button for "REFER," and the exemplary screen would change to a form such as shown in FIG. 11 where the operator's previous "REFER" choice is displayed at the top, together with six possible narrower types of refrigeration appliances listed below. Then, if the operator is looking at a load of one or more "GE DELUXE" type refrigerators the operator would touch the "GE DELUXE" type and thereby change the screen again to a format such as shown in FIG. 12.

Figure 12:
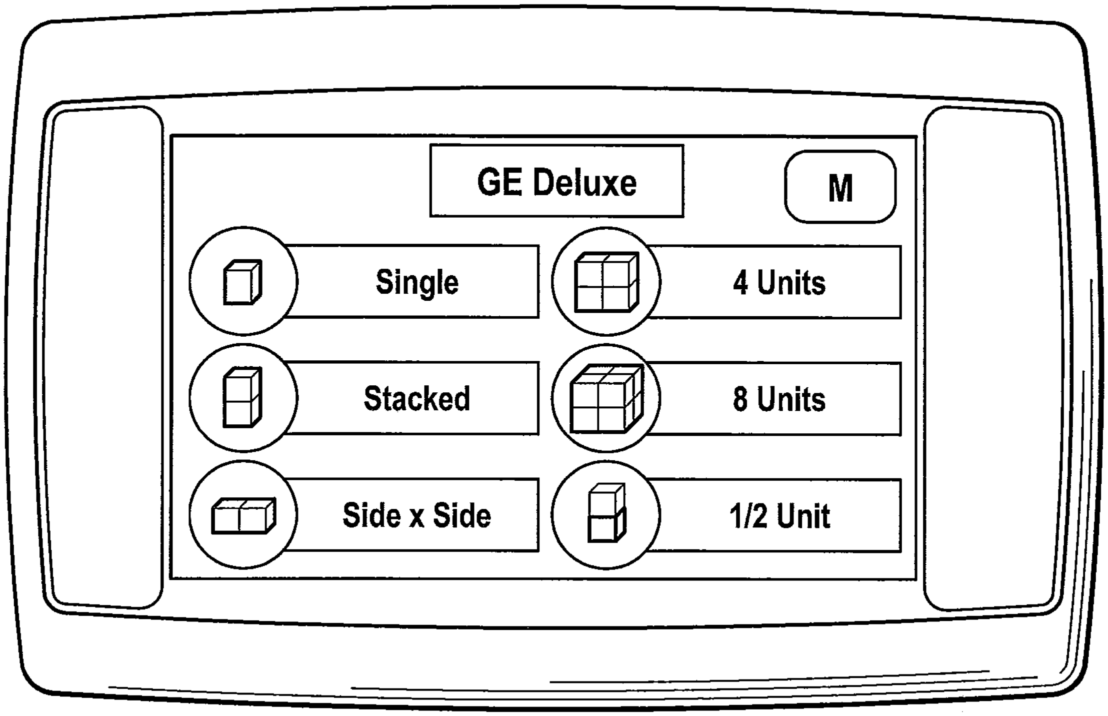
Figure 13:
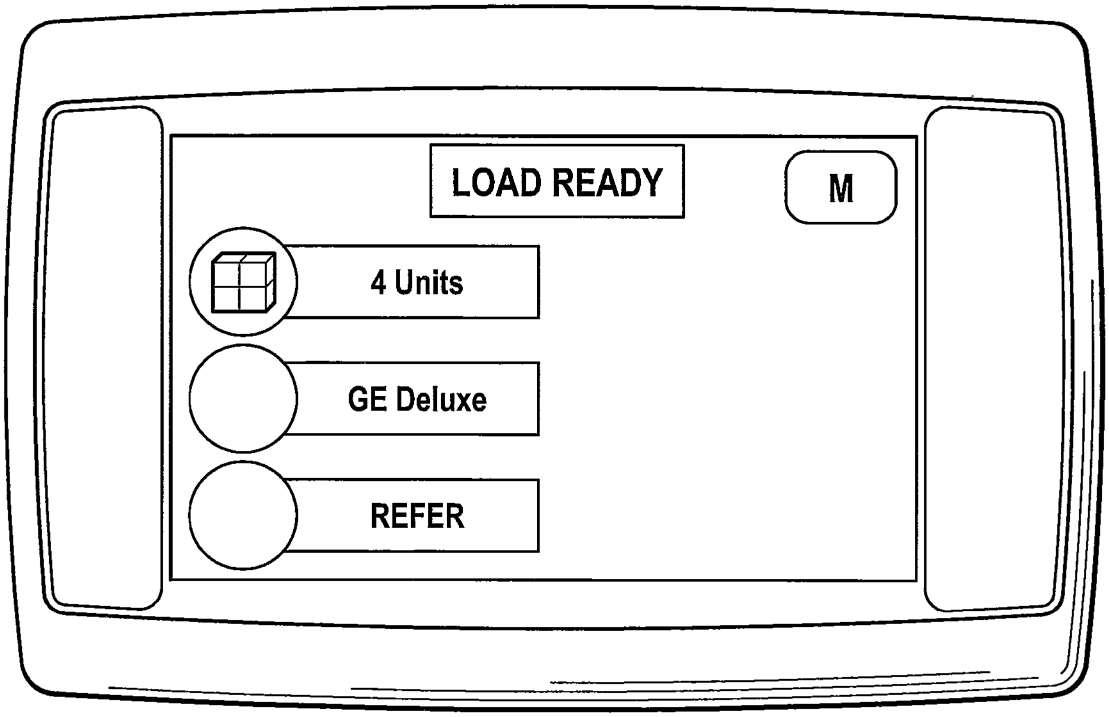

FIG. 12 suggests six different possible load geometric configurations for the "GE DELUXE" type listed at the top of the screen. If the operator's visual observation of the intended load reveals that there are four such "GE DELUXE" items stacked together in side-by-side groups of two, this would prompt him to press the "FOUR UNITS" button on the screen of FIG. 12 because this selection displays a visual diagram of such a side-by-side stacking arrangement. This selection then changes the screen to the format shown in FIG. 13 displaying the "FOUR UNITS" choice, while also indicating "LOAD READY" at the top, indicating that the controller 104 has selected from its lookup tables a predetermined clamping surface pre-engagement position matching the particular load type and/or geometric configuration. Accordingly the operator, through or under the guidance of the controller 104, can begin moving the clamping surfaces to their predetermined pre-engagement positions by actuation of the appropriate valves 124 and/or 127 in FIG. 9. Optionally, if desired, the controller 104 can also automatically control the optimum clamping force as described above.

Preferably, the controller 104 could optionally also include a data recorder function for recording and reporting useful information regarding driver identification, times, dates, operator inputs, and/or intended or achieved clamping surface pre-engagement positions for particular operator uses or attempted uses of the control system such as, for example, those which may not result in the system's successful selection of a correct pre-engagement position, or which may require corrective manual control, etc.

Paper rolls are an alternative example of completely different types of loads to be clamped by the present system. Initially, for example, different alternative visually discernible diameters of the rolls, such as 30-inch, 45-inch or 60-inch, could be listed on a screen comparable to FIG. 11. Then different possible geometric load configurations of one or more rolls to be clamped could be listed on a screen comparable to FIG. 12, with the system otherwise functioning as described above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A control system for a load-handling clamp mountable on a vehicle, said clamp having a pair of opposed load-engagement clamping surfaces capable of clamping opposite sides of a load, said clamp being mountable on said vehicle so that at least one of said clamping surfaces is closable toward the other clamping surface along a direction extending substantially across a direction of approach of said vehicle toward said load, said control system being capable of generating a variable signal containing information variably indicative of a location of a predetermined minor internal portion of said load, said location comprising at least one of a) a center of the content object inside an exterior container of said load, wherein the content object can be of various sizes and placements inside said exterior container; or b) a reinforcement of said exterior container of said load;

said information variably indicating a desired pre-engagement position of said clamp from which said clamping surfaces can clamp said load in a predetermined positional relationship to said location;

wherein said control system is configured to control the pair of clamping surfaces using said generated variable signal.

2. The control system of claim 1 wherein said variable signal is a humanly-discernible signal capable of guiding a human operator to achieve said desired pre-engagement position.

3. The control system of claim 1 wherein said variable signal is a signal to an electrical controller enabling said controller automatically to achieve said desired pre-engagement position.

4. The control system of claim 1 having an electrical controller operable to receive information entered by a human operator describing said load and operable to automatically determine from said information said desired pre-engagement position of said clamp.

5. The control system of claim 1 wherein said variable signal indicates said desired pre-engagement position substantially along said direction of approach of said vehicle.

6. The control system of claim 1 wherein said variable signal indicates said desired pre-engagement position in a substantially vertical direction.

7. The control system of claim 1 wherein said variable signal indicates said desired pre-engagement position substantially along said direction extending across said direction of approach.

8. A control system for a load-handling clamp mountable on a vehicle, said clamp having a pair of opposed load-engagement clamping surfaces capable of clamping opposite sides of a load, said clamp being mountable on said vehicle so that at least one of said clamping surfaces is closable toward the other clamping surface along a direction extending substantially across a direction of approach of said vehicle toward said load, said control system being capable of generating a variable signal, variably indicative of a desired pre-engagement position of said clamp, relative to said load from which said clamping surfaces can clamp said load, in response to both:

(a) first information variably indicative of a location of a predetermined internal feature of said load; and (b) second information indicative of a said desired pre-engagement position of said clamp variably depending on said first information;

wherein said location of said predetermined internal feature of said load comprising at least one of a) a center of the content object inside an exterior container of said load, wherein the content object can be of various sizes and placements inside said exterior container; or b) a reinforcement of said exterior container of said load; and wherein said control system is configured to control the pair of clamping surfaces using said generated variable signal.

9. The control system of claim 8 wherein said first information is obtainable in response to an operator's visual observation of said load.

10. The control system of claim 8, said control system being capable of obtaining said first information while a forward surface of said load, along said direction of approach, is located forwardly beyond a forward extremity of said clamp.

11. The control system of claim 8 wherein said variable signal is a humanly-discernible signal capable of guiding an operator to achieve said desired pre-engagement position of said clamp.

12. The control system of claim 8 wherein said variable signal is a signal to an electrical controller enabling said controller automatically to achieve said desired pre-engagement position of said clamp.

13. The control system of claim 8, said control system having an electrical controller operable to receive information entered by a human operator describing said load and to determine from said information said desired pre-engagement position of said clamp.

14. The control system of claim 8 wherein said variable signal indicates said desired pre-engagement position substantially along said direction of approach of said vehicle.

15. The control system of claim 8 wherein said variable signal indicates said desired pre-engagement position in a substantially vertical direction.

16. The control system of claim 8 wherein said variable signal indicates said desired pre-engagement position substantially along said direction extending across said direction of approach.

17. A control system for a load-handling clamp mountable on a vehicle, said clamp having a pair of opposed load-engagement clamping surfaces capable of clamping opposite sides of a load with a clamping force, said clamp being mountable on said vehicle so that at least one of said clamping surfaces is closable toward the other clamping surface along a direction extending substantially across a direction of approach of said vehicle toward said load, said control system being capable of generating a variable signal indicating a desired pre-engagement position of said clamp, from which said clamping surfaces can clamp said load, in depending upon information variably indicative of a location of a predetermined internal feature of said load entered into said system by a human operator from visual observation of said load;

wherein said location of said predetermined internal feature of said load comprising at least one of a) a center of the content object inside an exterior container of said load, wherein the content object can be of various sizes and placements inside said exterior container; or b) a reinforcement of said exterior container of said load; and wherein said control system is configured to control the pair of clamping surfaces using said generated variable signal.

18. The control system of claim 17, said control system further being capable of generating a variable signal indicating a desired clamping force with which said clamping surfaces can clamp said load, in response to at least some of said information.

19. The control system of claim 17 wherein said variable signal is a humanly discernible signal capable of guiding a human operator to achieve said desired pre-engagement position.

20. The control system of claim 17 wherein said variable signal is a signal to an electrical controller enabling said controller automatically to achieve said desired pre-engagement position.

21. The control system of claim 17 wherein said variable signal indicates said desired pre-engagement position substantially along said direction of approach of said vehicle.

22. The control system of claim 17 wherein said variable signal indicates said desired pre-engagement position in a substantially vertical direction.

23. The control system of claim 17 wherein said variable signal indicates said desired pre-engagement position substantially along said direction extending across said direction of approach.

* * * * *